(12) United States Patent
Duan

(10) Patent No.: US 9,351,210 B2
(45) Date of Patent: May 24, 2016

(54) METHOD AND DEVICE FOR SELECTING CORE NETWORK DEVICE

(71) Applicant: DATANG MOBILE COMMUNICATIONS EQUIPMENT CO., LTD., Beijing (CN)

(72) Inventor: Jianghai Duan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 14/359,581

(22) PCT Filed: Nov. 23, 2012

(86) PCT No.: PCT/CN2012/085160
§ 371 (c)(1),
(2) Date: Aug. 13, 2014

(87) PCT Pub. No.: WO2013/078965
PCT Pub. Date: Jun. 6, 2013

(65) Prior Publication Data
US 2015/0189564 A1 Jul. 2, 2015

(30) Foreign Application Priority Data
Dec. 1, 2011 (CN) .......................... 2011 1 0392941

(51) Int. Cl.
*H04W 36/14* (2009.01)
*H04W 48/18* (2009.01)
*H04W 76/02* (2009.01)
*H04W 4/00* (2009.01)
*H04W 48/06* (2009.01)
*H04W 8/22* (2009.01)

(52) U.S. Cl.
CPC .............. *H04W 36/14* (2013.01); *H04W 48/18* (2013.01); *H04W 76/021* (2013.01); *H04W 4/005* (2013.01); *H04W 8/22* (2013.01); *H04W 48/06* (2013.01)

(58) Field of Classification Search
CPC ..... H04W 4/005; H04W 4/08; H04W 76/021; H04W 8/26; H04W 48/18; H04W 72/02; H04L 67/1044; H04L 61/2069; H04L 63/065
USPC ....................................................... 455/435.3
See application file for complete search history.

(56) References Cited

U.S. PATENT DOCUMENTS

2012/0185576 A1* 7/2012 Qu et al. ....................... 709/223

FOREIGN PATENT DOCUMENTS

| CN | 102123477 | 7/2011 |
| CN | 102123477 A | 7/2011 |

(Continued)

OTHER PUBLICATIONS

China Mobile:"Taking MTC indication into account in MME load balancing", 3GPP Draft; S2-104819_Taking MTC Indication Into Account in MME Load Balancing, 3rd Generation.

(Continued)

*Primary Examiner* — Kabir A Timory
(74) *Attorney, Agent, or Firm* — Gokalp Bayramoglu

(57) ABSTRACT

A method and a device for selecting a core network device. The method includes: an access network device determining the equipment type of a user equipment (UE); when the equipment type is a machine type communication (MTC) UE, the access network device determining an MTC group identifier corresponding to the UE; when the MTC group identifier corresponds to a core network device, the access network device selecting the core network device corresponding to the MTC group identifier as a core network device which the UE accesses. In the embodiments of the present application, a plurality of MTC UE corresponding to the same MTC group identifier can select the same core network device to access a mobile communication network, and thus being able to save network resources and reduce signaling overhead using a public bearer.

9 Claims, 3 Drawing Sheets

(56) References Cited

FOREIGN PATENT DOCUMENTS

| | | |
|---|---|---|
| CN | 102215457 | 10/2011 |
| CN | 102215457 A | 10/2011 |
| JP | 2008-124799 | 5/2008 |
| JP | 2010-534961 | 11/2010 |
| WO | WO2011042417 | 4/2011 |
| WO | WO 2011/082636 | 7/2011 |
| WO | WO2011/127710 | 10/2011 |
| WO | WO2011/140884 | 11/2011 |

OTHER PUBLICATIONS

Partnership Project(3GPP),Mobile Competence Centre:650,Route Des Lucioles; F-06921 Sophia-Antipolis Cedex; France, vol. SA WG2, No. Prague;20101011; Oct. 6, 2010.
XP050459612.

Panasonic: Solution for Group-based Optimization°, 3GPP Draft; S2-101288,3rd Generation Partnership Project(3GPP),Mobile Competence Centre;650,Route Des Lucioles; F-06921.
SOPH1A-Antipolis Cedex;France, vol. SA WG2, No. San Francisco, USA; 20100222, Feb. 16, 2010, XP050433821.
Vodafone:"M2M related updates", 3GPP Draft; S2-104259,3rd Generation Partnership Project(3GPP),Mobile Competence Centre;650,Route Des Lucioles; F-06921.
Sophia-Antipolis Cedex;France, vol. SA WG2, No. Brunstad; 20100903, Sep. 3, 2010, XP050459181.
Huawei:"Solution for congestion situation indication", 3GPP Draft; S2-103161__Solution for Congestion Situation Indication, 3rd Generation Partnership Project(3GPP),Mobile.
Competence Centre; 650, Route Des Lucioles; F-06921 Sophia-Antipolis Cedex; France; vol. SA WG2, No. Elbunia; 20100706-20100713, Jun. 29, 2010, XP0506308.

* cited by examiner

METHOD AND DEVICE FOR SELECTING CORE NETWORK DEVICE

This application claims priority to Chinese Patent Application No. 201110392941.0, titled "Method and Device for Selecting Core Network Device", filed on Dec. 1, 2011 in the Chinese Patent Office, the entire contents of which are incorporated herein by reference.

TECHNICAL FIELD

The application relates to communication technology field, and in particular, to a method and a device for selecting a core network device.

BACKGROUND

Machine to machine (M2M) communication is also called as a Machine Type Communication (MTC), and can be widely used in intelligent transportation, remote meter reading, medical health, video surveillance, smart home furnishing, smart grid and other fields. A device involved in the M2M communication is an MTC User Equipment (MTC UE), and a network entity providing M2M service is an MTC server; the MTC server is communicated with the MTC UE via a mobile communication network, thereby enabling the management and monitoring of the MTC UE. FIGS. 1 and 2 are diagrams of an MTC UE access to a 3G mobile communication network and a 4G mobile communication network, respectively.

In FIGS. 1 and 2, a Non-MTC UE refers to a UE which communicates by means of Human to Human (H2H). The Non-MTC UE may establish an IP channel with Packet Data Network (PDN) after being assigned an IP address, thereby enabling an upper layer service communication with the PDN; similarly, an MTC UE may establish an IP channel with the MTC server after being assigned an IP address, thereby enabling an upper layer service communication with the MTC server.

It should be noted that, the IP channel established between the MTC UE and the MTC server is a logical IP channel. As shown in FIG. 1, the physical path of the 3G mobile communication network may pass through a base station (Node B), a Radio Network Controller (RNC) and a Gateway GPRS Support Node (GGSN); as shown in FIG. 2, the physical path of the 4G mobile communication network may pass through an Evolved Node B (e-Node B, namely a base station), a Serving Gateway (SGW) and a Packet Data Gateway (PGW).

Moreover, compared with H2H communication, the M2M communication has significant differences in service characteristics. For example, the M2M communication has a large number of MTC UE, and the MTC UE typically has a lower amount of data, etc. For example, for an automatic meter reading system installed in community residents' houses a large number of MTC UE need to be distributed in a small area, and the amount of data of each MTC UE does not exceed hundreds of bits every day.

In the implementation of the present application, the inventor has found that at leas following problems exist in the prior art:

When a UE accesses a mobile communication network, the access network such as Node B and e-Node B) and the core network (such as GGSN and PGW) of the mobile communication network are required to allocate bearer resources for each UE (e.g., MTC UE), and establish a corresponding binding relationship. When the MTC UEs are largely disposed and access the mobile communication network, a lot of network resources will be occupied and there will be a lot of signaling overhead, thereby resulting in an improper work of the mobile communication network or an impact on the H2H communication.

SUMMARY OF THE INVENTION

The embodiments of the application provide a method and a device for selecting a core network device to save network resources and reduce signaling overhead.

To achieve the above object, an embodiment of the application provides a method for selecting a core network device selection, comprising:

determining, by an access network device, the equipment type of a user equipment UE;

when the equipment type is an MTC UE, determining by the access network device, an MTC group identifier corresponding to the UE; and when the MTC group identifier corresponds to a core network device, selecting, by the access network device the core network device corresponding to the MTC group identifier as a core network device which the UE accesses.

An embodiment of the application provides an access network device, comprising:

a first determination module, configured to determine the equipment type of a user equipment UE;

a second determination module, configured to, when the equipment type is an MTC UE determine an MTC group identifier corresponding to UE; and a selection module, configured to, when the MTC group identifier corresponds to a core network device, select the core network device corresponding to the MTC group identifier as a core network device which the UE accesses.

Compared with the prior art, the embodiments of the present application at least has the following advantages:

a plurality of MTC UEs corresponding to the same MTC group identifier may select the same core network device to access to the mobile communication network, thereby saving network resources and reducing signaling overhead by using a public bearer.

BRIEF DESCRIPTION OF THE DRAWINGS

In order to more clearly illustrate the technical solutions of the present application, the accompanying drawings needed to be used in the following description of the embodiments will be explained simply. Apparently, the drawings described below are merely some embodiments of the present application, and an ordinary person skilled in the art may also obtain other drawings without paying any creative effort.

DETAILED DESCRIPTION OF THE EMBODIMENTS

Hereinafter, the technical solution of the present application will be clearly and fully described with reference to the drawings in the present application. Obviously, the described embodiments are only part of the embodiments of the present application, but not all embodiments. Based on the embodiments in the present application, all other embodiments obtained by an ordinary person skilled in the art without paying any creative efforts will belong to the protection scope of the present application.

First Embodiment

The first embodiment of the present application provides a method for selecting a core network device. During the access of a UE to a mobile communication network, a access network device may select a core network device for the accessed UE; this method can be applied to application situations such as the access of an MTC UE to a 3G mobile communication network or the access of a MTC UE to a 4G mobile communications network; in the 3G mobile communication network, the core network device may be a Serving GPRS Supporting Node (SGSN), and the access network device may be a RNC; in the 4G mobile communication network, the core network device may be a Mobility Management Entity (MME) and the access network device may be an e-Node B.

Figure 1:
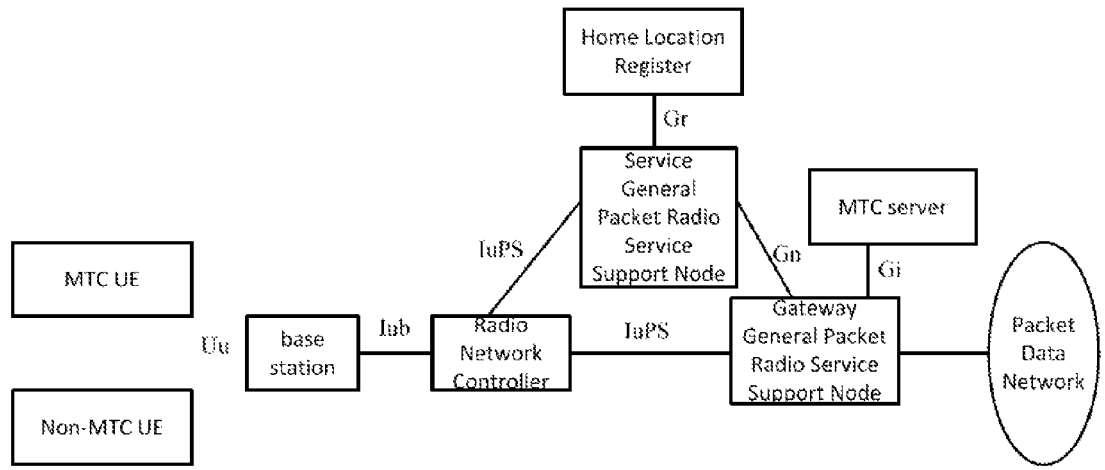
FIG. 1 is a diagram showing that an MTC UE accesses a 3G mobile communication network in the prior art.
Figure 2:
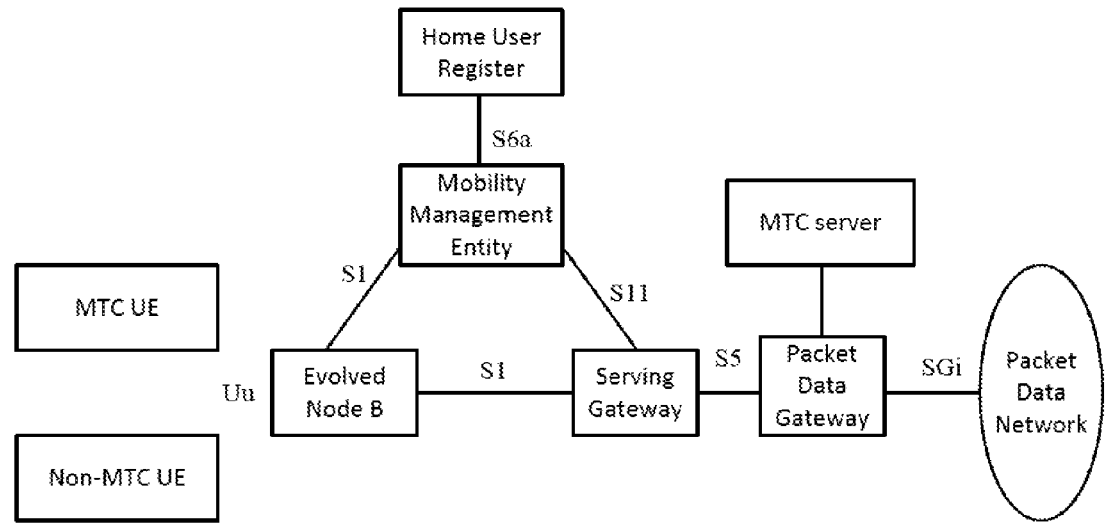
FIG. 2 is a diagram showing that an MTC UE accesses a 4G mobile communication network in the prior art.
Figure 3:
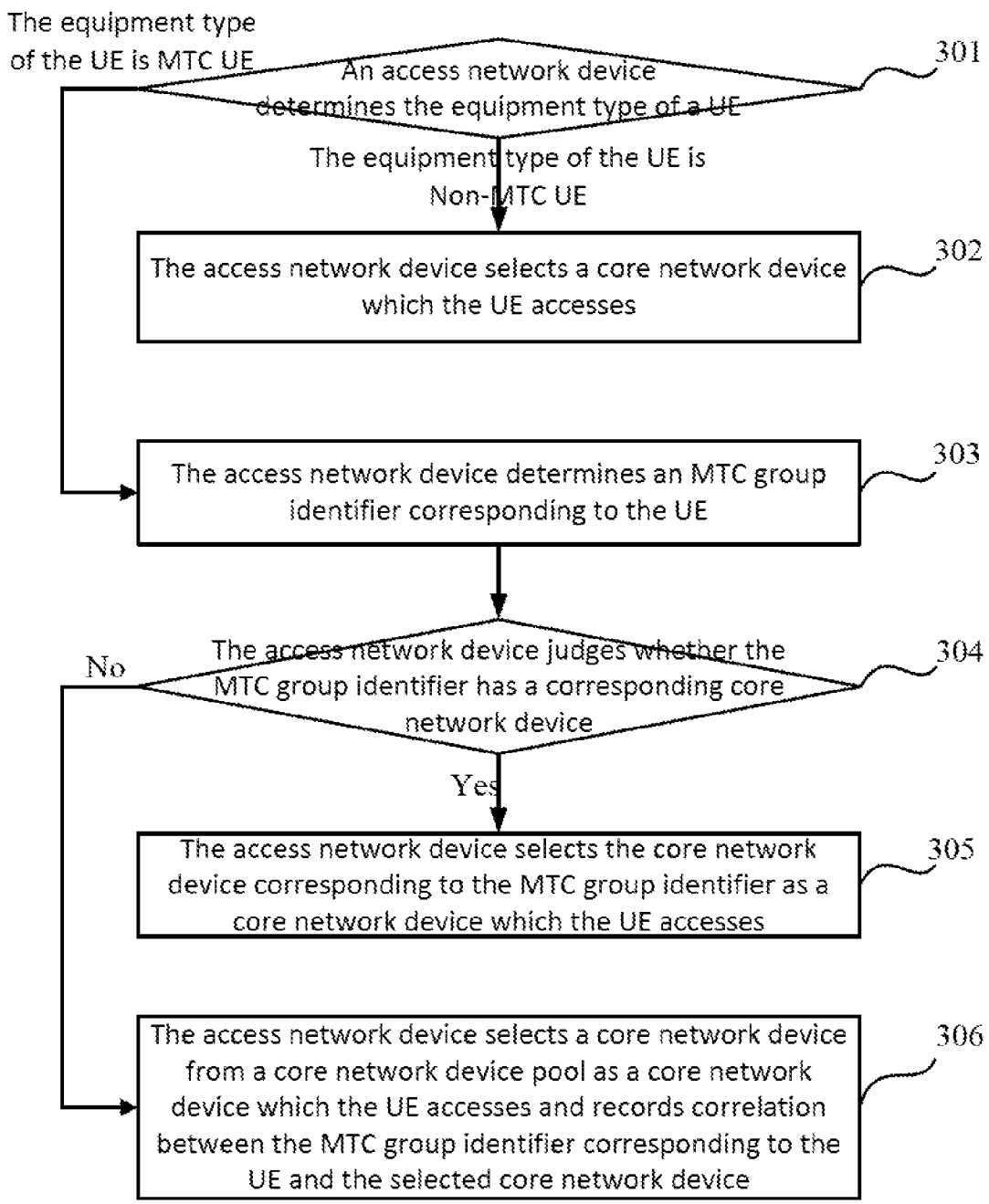
FIG. 3 is a schematic flow chart showing a method for selecting a core network device provided by a first embodiment of the present application.

As shown in FIG. 3, the method for selecting a core network device may comprise the following steps:

Step 301, an access network device (RNC or e-Node B) determines the equipment type of a UE.

In this embodiment of the present application, after the UE accesses a mobile communication network (such as a 3G mobile communication network or a 4G mobile communication network), the access network device needs to determine the equipment type of the UE. The equipment type of the UE may be a Non-MTC UE or an MTC UE; when the equipment type of the UE is the Non-MTC UE, step 302 is executed; when the equipment type of the UE is the MTC UE, step 303 is executed.

Step 302, the access network device selects a core network device (such as an SGSN or an MIME) to be accessed by the UE, the selection method can be implemented according to the prior art, the description thereof is omitted in the embodiment of the present application.

Step 303, the access network device determines an MTC group identifier corresponding to the UE.

In a practical application, if a plurality of MTC UEs have the same management property, the MTC UEs may be constituted as an MTC group and distinguished with an MTC group identifier; therefore, when a UE is determined as an MTC UE, the access network device may determine the MTC group identifier corresponding to the MTC UE.

In the embodiment of the present application, based on the MTC group identifier, the core network device GGSN or SGW of the 3G mobile communication network or the 4G mobile communication network may assign bearer resources according to the MIC group identifier, and the MTC UE may use the bearer resources corresponding to the MTC group to which the MTC UE belongs when the MTC UE accesses the 3G mobile communication network or the 4G mobile communication network, thereby solving the problem of occupying a lot of network resources when a large number of MTC UEs access the 3G mobile communication network or the 4G mobile communication network.

Step 304, the access network device determines whether the MTC group identifier corresponds to a core network device; when the MTC group identifier corresponds to a core network device, step 305 is performed; when the MTC group identifier does not correspond to a core network device, step 306 is performed.

In the embodiment of the present application, for each MTC group identifier, the access network device may be required to maintain the correspondence between the MTC group identifier and the core network device. It should be noted that, based on the correspondence, for the MTC UE which is the first to access the mobile communication network in the MTC group, it may be determined that the MTC group identifier does not correspond to a core network device during the access process of the MTC UE; for the MTC UE which is not first to access a mobile communication network in the MTC group, it may be determined that the MTC group identifier corresponds to a core network device during the access process of the MTC UE.

Step 305, the access network device selects the core network device corresponding to the MTC group identifier as a core network device which the UE accesses.

For example, UE1, UE2 and UE3 are all MTC UE, UE1, UE2 and UE3 constitute a MTC group and a MTC group identifier A may be used for distinguishing the MTC group; assuming that the UE1 is the first to access the mobile communication network and the core network device selected by the access network device for UE1 is core network device A, then when the UE2 accesses the mobile communication network, it may be determined that MTC group identifier A corresponding to the UE2 has a corresponding core network device A and the access network device selects the core network device A as the core network device which the UE2 accesses; similarly, the access network device will also select the core network device A as the core network device which the UE3 accesses.

Step 306, the access network device selects a core network device from a core network device pool (Pool) as a core network device which the UE accesses, and records the correspondence between the MTC group identifier corresponding to the UE and the selected core network device.

In the Embodiment of the present application, the step that the access network device selects the core network device from a core network device Pool as a core network device which the UE accesses includes: the access network device select the core network device from the core network device Pool as the core network device which the UE accesses by regarding the MTC group as a unit and by using the weight of each core network device in the core network device Pool (such as SGSN Pool or MME Pool) and a preset strategy, wherein the preset strategy can be enable that the selection probability of each core network device is proportional to the weight of each core network device.

Specifically, in the 3G mobile communication network or the 4G mobile communication network, the core network device may be typically organized with a Pool manner; when the UE accesses the 3G mobile communication network or the 4G mobile communication network, the access network device may first determine an accessed core network device for the UE from the core network device Pool; subsequently, the selected core network device may request a GGSN or an SGW to allocate bearer resources and inform the access network device of the allocation result of the GGSN or the SGW; subsequently, the access network device may allocate the bearer resources for the UE to establish a binding relationship, and inform the GGSN or the SGW of the allocation result via the core network device to establish a binding relationship by the GGSN or the SGW.

During the specific implementation as described above, the step that the access network device selects the core network device from a core network device Pool as a core network device which the UE accesses may specifically be: the access network device determining the accessed core network device for the UE from core network device Pool on a basis of a principle of the load balancing. Specifically, each core network device in the core network device Pool may be assigned a weight according to its capacity, the access network device may select the core network device according to the weight, so that the selection probability of each core network device is proportional to the weight, thereby resulting in a load balancing between various core network devices in the core network device Pool.

Compared with the prior art, the embodiment of the application at least has the following advantages:

In the prior art, the UE type is not be distinguished during the selection of the core network device and the MTC group to which it belongs is not distinguished for the MTC UE; for the accessing MTC UEs in the same MTC group, they are evenly distributed on the various core network devices in the core network device Pool; on the other hand, since the bearer allocation process of the core network is triggered by the selected core network device, in the prior art, the requirement in which the MTC UEs within the same MTC group share a public core network bearer resource can not be achieved.

Further, when the number of core network device Pools is relatively large, and/or the number of core network devices within the same core network device Pool is relatively large and/or the number of MTC groups is relatively large, the problem of occupying a lot of network resources by the MTC UE accessing core network may be caused.

For the above-mentioned problems, in the present embodiment, when the access network device determines the accessed core network device for the LIE with the use of networking of the core network device Pool, it is required to consider information such as the equipment type of the UE (such as the MTC UE or the Non-MTC UE) and the MTC group identifier to which the MTC LIE belongs, thereby resulting in that when a large number of MTC UEs access the 3G mobile communication network or the 4G mobile communication network, the problem of occupying a lot of core network resources may be solved; and a plurality of MTC UEs corresponding to the same MTC group identifier may select the same core network device to access the mobile communication network, thereby saving network resources and reducing signaling overhead by using a public bearer.

Second Embodiment

Figure 4:
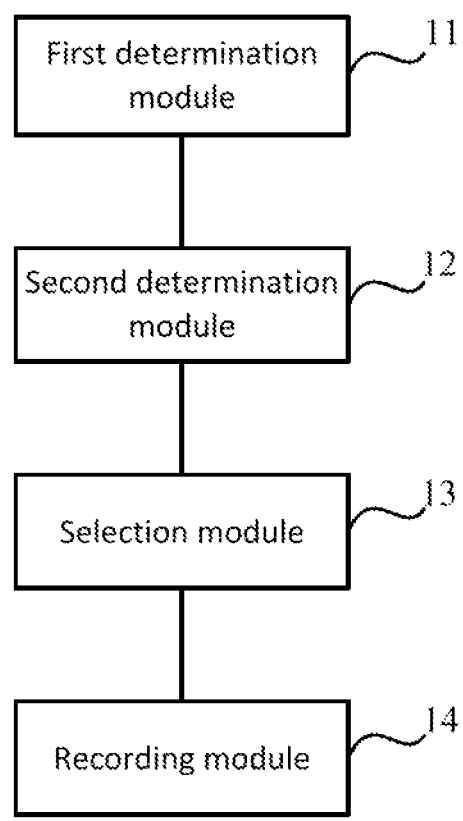
FIG. 4 is a schematic block diagram of an access network device provided by a second embodiment of the present application.

Based on the same inventive concept with the above method, an embodiment of the present application provides an access network device. As shown in FIG. 4, the device comprises:

a first determination module 11, configured to determine the equipment type of a user equipment (UE);

a second determination module 12, configured to, when the equipment type is a machine type communication (MTC) UE, determine an MTC group identifier corresponding to the UE;

a selection module 13, configured to, when the MTC group identifier corresponds to a core network device, select the core network device corresponding to the MTC group identifier as a core network device which the UE accesses.

The first determination module 11 is specifically configured to determine the equipment type of the UE after the UE accesses a mobile communication network, wherein the equipment type of the UE is a Non-MTC UE or an MTC UE.

The selection module 13 is also configured to select the core network device from a core network device pool Pool as the core network device which the UE accesses when the MTC group identifier does not correspond to a core network device.

The selection module 13 is further configured to select the core network device from the core network device Pool as the core network device which the UE accesses, by using the weight of each core network device in the core network device Pool and a preset strategy, wherein the preset strategy is that the selection probability of each core network device is proportional to the weight of each core network device.

In the embodiment of the present application, the access network device may also include: a recording module 14, configured to, after selecting the core network device from a core network device Pool as the core network device which the UE accesses, record correspondence between the MTC group identifier corresponding to the UE and the selected core network device.

Herein, various modules of the device according to the application may be integrated as a whole or disposed independently. The above mentioned modules may be incorporated into a single module or further separated into several modules.

Through above description of the embodiments, it should be understood by a person skilled in the art that the present application may be implemented by means of software in connection with necessary universal hardware platform. Of course, the present application may also be implemented by a hardware. However, in many cases the former is more preferred. Based on this understanding, all or the part contributing to the prior art of the technical solution of the present application may be embodied in the form of software. The computer software may be stored in a storage medium and include a plurality of instructions which is used to implement the method as described in the various embodiments of the application by a computer apparatus (may be a personal computer, a server or a network equipment, etc.).

Based on the above content, the present application may also provide a computer-readable recording medium on which a program for executing the above method for selecting a core network device is recorded. Herein, the specific content of the method for selecting a core network device can be found in that as described in the method embodiment, thus the description thereof will be omitted.

The computer-readable recording medium may include any mechanism for storing or transmitting information in a readable former by a computer (such as computing machine). For example, a machine-readable medium includes a read only memory (ROM), a random access memory (RAM), a magnetic disk storage media, an optical storage media, a flash storage media, propagated signals (such as, a carrier, infrared signals, digital signals, etc.) in electrical, optical, acoustical or other form.

It should be understood by a person skilled in the art that the accompanying drawings are simply schematic views of a preferred embodiment and the modules or processes in the accompanying drawings are not necessarily required to implement the present application.

It should be understood by a person skilled in the art that the modules in the device of the embodiment may be distributed in the device of the embodiment according to the description of the embodiment, or may be accordingly changed to be positioned in one or more devices different from those in this embodiment. The modules in the above embodiment may be incorporated into a single module or further separated into several modules.

The sequence number in the above embodiments of the application is only for the purpose of explanation and not intended to indicate the merits of the embodiments.

Disclosed above are only several specific embodiments of the application, but the present application is not limited thereto, and any changes that could be conceived by a person skilled in the art should be fallen within the scope of the present application.

The invention claimed is:

1. A method for selecting a core network device, comprising:
   determining an equipment type of a user equipment (UE) by an access network device;
   when the equipment type is a machine type communication user equipment (MTC UE), determining an machine type communication (MTC) group identifier corresponding to the UE by the access network device; and
   when the MTC group identifier corresponds to a core network device, selecting the core network device corresponding to the MTC group identifier as a core network device which the UE accesses by the access network device;
   wherein, after the step of determining a MTC group identifier corresponding to the UE, the method further comprises:
   when the MTC group identifier does not correspond to a core network device, selecting a core network device from a core network device pool as a core network device which the UE accesses by the access network device;
   wherein, the step of selecting a core network device from a core network device pool as a core network device which the UE accesses comprises:
   selecting the network device from the core network device pool as the core network device which the UE accesses by the access network device and by using a weight of each core network device in the core network device pool and a preset strategy, wherein the preset strategy is to ensure that a selection probability of each core network device is proportional to the weight of each core network device.

2. The method according to claim 1, wherein, the step of determining an equipment type of a user equipment UE comprises:
   after the UE accesses a mobile communication network, determining the equipment type of the UE by the access network device, wherein the equipment type of the UE is a Non-MTC UE or an MTC UE.

3. The method according to claim 1, wherein, after the step of selecting a core network device from a core network device pool as a core network device which the UE accesses, the method further comprises:
   recording a correspondence between the MTC group identifier corresponding to the TIE and the selected core network device by the access network device.

4. An access network device, comprising:
   a first determination module implemented by a first hardware, configured to determine an equipment type of a use equipment, UE;
   a second determination module implemented by a second hardware, configured to determine an machine type communication (MTC) group identifier corresponding to the user equipment (UE) when the equipment type is an machine type communication user equipment (MTC UE); and
   a selection module implemented by a third hardware, configured to select a core network device corresponding to the MTC group identifier as a core network device which the UE accesses when the MTC group identifier corresponds to a core network device;
   the selection module is further configured to select a core network device from a core network device pool, pool as a core network device which the TIE accesses when the MTC group identifier does not correspond to a core network device;
   the selection module is further configured to select the core network device from the core network device pool as the core network device Which the UE accesses by using a weight of each core network device in the core network device pool and a preset strategy, wherein the preset strategy is to ensure that a selection probability of each core network device is proportional to the weight of each core network device.

5. The access network device according to claim 4, wherein,
   the first determination module is specifically configured to determine the equipment type of the (UE) after the UE accesses a mobile communication network, wherein the equipment type of the UE is a Non-MTC UE or an MTC UE.

6. The access network device according to claim 4 further comprising:
   a recording module configured to record correspondence between the MTC group identifier corresponding to the UE and the selected core network device after selecting;
   the core network device born a core network device pool, pool as a core network device which the UE accesses.

7. A non-transitory computer-readable recording medium on which a program configured to execute a method is recorded, the method comprising:
   determining an equipment type of a user equipment (UE) by an access network device;
   when the equipment type is a machine type communication user equipment (MTC UE), determining an machine type communication (MTC) group identifier corresponding to the UE by the access network device; and
   when the MTC group identifier corresponds to a core network device, selecting the core network device corresponding to the MTC group identifier as a core network device which the UE accesses by the access network device;
   wherein, after the step of determining a MTC group identifier corresponding to the UE, the method further comprises:
   when the MTC group identifier does not correspond to a core network device, selecting a core network device from a core network device pool, pool as a core network device which the UE accesses by the access network device;
   wherein, the step of selecting a core network device from a core network device pool as a core network device which the UE accesses comprises:
   selecting the network device from the core network device pool as the core network device Which the UE accesses by the access network device and by using a weight of each core network device in the core network device pool and a preset strategy, wherein the preset strategy is to ensure that a selection probability of each core network device is proportional to the weight of each core network device.

8. The method according to claim 1, wherein, after the step of selecting a core network device from a core network device pool as a core network device which the UE accesses, further comprising:
   recording a correspondence between the MTC group identifier corresponding to the UE and the selected core network device by the access network device.

9. The access network device according to claim 4, further comprising:
  a recording module configured to record correspondence between the MTC group identifier corresponding to the UE and the selected core network device after selecting the core network device from a core network device pool, pool as a core network device which the UE accesses.

* * * * *